US009886985B1

United States Patent
Okamoto et al.

(10) Patent No.: US 9,886,985 B1
(45) Date of Patent: Feb. 6, 2018

(54) DISK DEVICE WITH HOUSING ACCOMMODATING ROTATABLE DISK

(71) Applicant: Kabushiki Kaisha Toshiba, Minato-ku, Tokyo (JP)

(72) Inventors: Makoto Okamoto, Kodaira Tokyo (JP); Takuma Kido, Mitaka Tokyo (JP); Yasutaka Sasaki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/459,524

(22) Filed: Mar. 15, 2017

Related U.S. Application Data

(60) Provisional application No. 62/371,302, filed on Aug. 5, 2016.

(51) Int. Cl.
*G11B 33/12* (2006.01)
*G11B 33/14* (2006.01)
*G11B 33/02* (2006.01)

(52) U.S. Cl.
CPC ........ *G11B 33/1466* (2013.01); *G11B 33/027* (2013.01); *G11B 33/122* (2013.01); *G11B 33/126* (2013.01)

(58) Field of Classification Search
CPC . G11B 33/1466; G11B 33/027; G11B 33/122; G11B 33/126
See application file for complete search history.

(56) References Cited

U.S. PATENT DOCUMENTS

| | | | | |
|---|---|---|---|---|
| 5,357,386 A | * | 10/1994 | Haidari | G11B 5/4846 360/99.18 |
| 5,541,787 A | | 7/1996 | Jabbari et al. | |
| 5,609,496 A | | 3/1997 | Kilmer et al. | |
| 5,646,801 A | * | 7/1997 | Boigenzahn | G11B 25/043 360/99.16 |
| 5,931,697 A | * | 8/1999 | Jeong | G11B 5/4846 439/556 |
| 6,168,459 B1 | * | 1/2001 | Cox | G11B 5/4846 360/99.18 |
| 6,678,112 B1 | * | 1/2004 | Kaneko | G11B 5/4846 360/99.18 |
| 6,721,135 B2 | | 4/2004 | Hong et al. | |
| 6,754,041 B2 | * | 6/2004 | Hong | G11B 5/486 360/99.18 |
| 6,970,322 B2 | * | 11/2005 | Bernett | G11B 25/043 360/245.9 |
| 7,123,440 B2 | * | 10/2006 | Albrecht | G11B 33/1466 360/99.18 |
| 7,361,844 B2 | * | 4/2008 | Vinciarelli | H05K 1/141 174/252 |

(Continued)

*Primary Examiner* — Brian Miller
(74) *Attorney, Agent, or Firm* — White & Case LLP (57) ABSTRACT

According to one embodiment, a disk device includes a housing and a sealing board fixed to a base of the housing. The base includes a through-hole and an installation surface formed around the through-hole. One of a first principal surface of the sealing board and the installation surface includes a projection formed therein. The sealing board is fixed to the installation surface by an adhesive material provided on an outer side of the projection with respect to the through-hole with the first principal surface or the installation surface abutting against the projection.

19 Claims, 9 Drawing Sheets

(56) References Cited

U.S. PATENT DOCUMENTS

| | | |
|---|---|---|
| 7,874,846 B2 | 1/2011 | Gunderson et al. |
| 7,952,879 B1 * | 5/2011 | Vinciarelli ............ H05K 7/209 |
| | | 165/185 |
| 9,230,598 B1 * | 1/2016 | Bernett ................ G11B 25/043 |
| 9,672,870 B1 * | 6/2017 | Mizumoto ........... G11B 33/122 |
| 2015/0098178 A1 * | 4/2015 | Otake ................ G11B 33/1446 |
| | | 361/679.33 |

\* cited by examiner

DISK DEVICE WITH HOUSING ACCOMMODATING ROTATABLE DISK

CROSS-REFERENCE TO RELATED APPLICATIONS

This application claims the benefit of U.S. Provisional Application No. 62/371,302, filed Aug. 5, 2016, the entire contents of which are incorporated herein by reference.

FIELD

Embodiments described herein relate generally to a disk device.

BACKGROUND

As a disk device, a magnetic disk drive includes a housing having a base and a top cover, and a rotatable magnetic disk and an actuator supporting thereon magnetic heads are arranged in the housing. As a method of improving the performance of the disk drive, a method of reducing the rotational resistance of the magnetic disk and the magnetic head by filling the housing with a low-density gas such as helium or the like, and closely sealing the housing is proposed.

In such a magnetic disk drive, the top cover is laser-welded onto the base of the housing thereby forming a hermetically-sealed housing and increasing the airtightness of the housing. This laser welding is carried out along the entire outer circumference of the top cover. Further, in order to transmit an electrical signal of the magnetic head provided inside the housing to a control circuit board provided outside the device, a connector penetrating the bottom wall of the housing is provided. In such a gas-filled magnetic disk drive described above, it is desirable that a hermetic connector be used as the aforementioned connector in order to maintain the airtightness of the housing.

DETAILED DESCRIPTION

Various embodiments will be described hereinafter with reference to the accompanying drawings. In general, according to one embodiment, a disk device comprises a rotatable disk recording medium; a head which processes data on the recording medium; a housing comprising a base accommodating the recording medium and the head and a cover joined to the base, the base comprising a through-hole and an installation surface formed around the through-hole; and a sealing board fixed to the installation surface of the base to block the through-hole, the sealing board comprising a first principal surface, a second principal surface on an opposite side to the first principal surface, and a conduction path electrically connecting the first principal surface and the second principal surface to each other. One of the first principal surface of the sealing board and the installation surface includes a projection formed therein, and the sealing board is fixed to the installation surface by an adhesive material including at least a brazing material, provided on an outer side of the projection, between the first principal surface and the installation surface, with the other of the first principal surface and the installation surface abutting against the projection.

Hereinafter, hard disk drives (HDDs) according to embodiments will be descried in detail as disk devices.

First Embodiment

Figure 1:
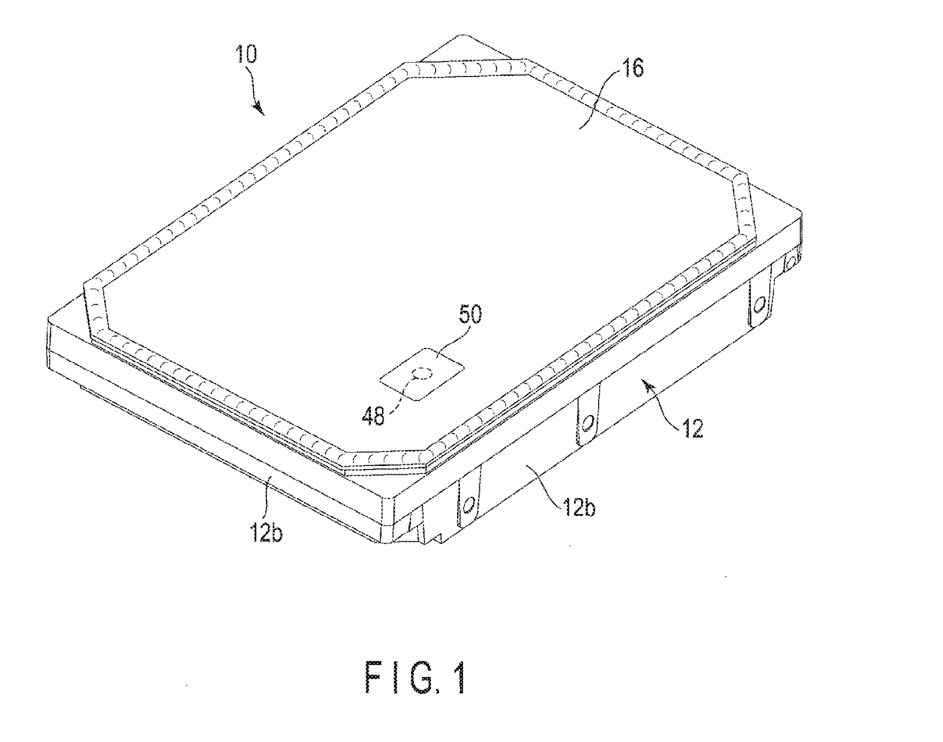
FIG. 1 is a perspective view showing an external view of a hard disk drive (HDD) according to a first embodiment.
Figure 2:
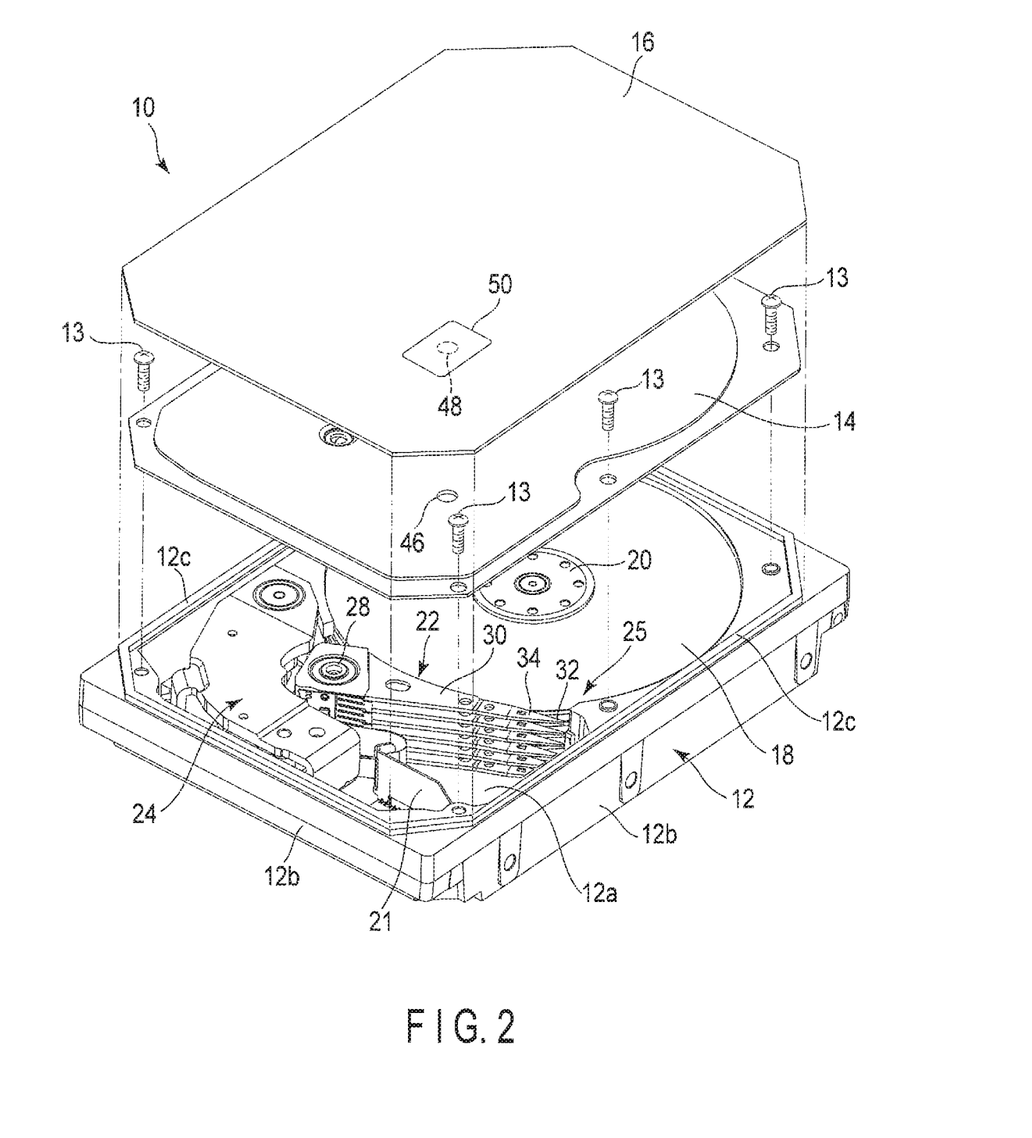
FIG. 2 is an exploded perspective view of the HDD according to the first embodiment.

FIG. 1 is a perspective view showing an external view of an HDD according to a first embodiment, and FIG. 2 is an exploded perspective view showing an internal structure of the HDD.

As shown in FIG. 1 and FIG. 2, the HDD includes a flat and substantially rectangular housing 10.

This housing 10 comprises a rectangular box-shaped base 12 opened at a top surface thereof, inner cover 14 screwed onto the base 12 by a plurality of screws 13 to thereby close the upper-end opening of the base 12, and outer cover (top cover) 16 placed on top of the inner cover 14, and a peripheral part of which is welded onto the base 12. The base 12 includes a rectangular bottom wall 12a opposed to the inner cover 14 with a gap held between them, and side wall 12b provided to stand along the periphery of the bottom wall 12a, and is integrally formed of, for example, aluminum. The side wall 12b includes a pair of long-side walls opposed to each other and a pair of short-side walls opposed to each other. A substantially rectangular frame-shaped fixing rib 12c is provided on the upper end surface of the side wall 12b in a projecting manner.

The inner cover 14 is formed of stainless steel into a rectangular plate. The inner cover 14 is screwed onto the top surface of the side wall 12b at a peripheral part thereof by means of screws 13 to thereby be fixed to the inside of the fixed rib 12c. The outer cover 16 is formed of, for example, aluminum into a rectangular plate-like shape. The outer cover 16 is formed in a planar size slightly greater than the inner cover 14. The outer cover 16 is welded onto the fixed rib 12c of the base 12 at the entire peripheral part thereof and is hermetically fixed. In each of the inner cover 14 and the outer cover 16, vents 46 and 48 through which the inside of the housing 10 communicates with the outside are formed, respectively. The air inside the housing 10 is exhausted through the vents 46 and 48 and, furthermore a low-density gas (inert gas), for example, helium having a density lower than that of air is infused through these vents 46 and 48. For example, a sealant (an adhesive material including at least a brazing material) 52 is stuck on the outer surface of the outer cover 16 so as to close the vent 48.

As shown in FIG. 2, a plurality of magnetic disks 18 serving as recording mediums, and a spindle motor 20 serving as a drive section configured to support and rotate the magnetic disks 18 are provided in the housing 10. The spindle motor 20 is arranged on the bottom wall 12a. Each of the magnetic disks 18 is formed into a size of, for example, 88.9 mm (3.5 inches) in diameter, and includes a magnetic recording layer in the top surface and/or in the undersurface thereof. Each of the magnetic disks 18 is fitted on a hub (not shown) of the spindle motor 20 coaxially with each other, and is clamped by a clamp spring to thereby be fixed to the hub. Each of the magnetic disks 18 is supported in a state where the disk 18 is positioned parallel to the bottom wall 12a of the base 12. Each of the magnetic disks 18 is rotated by the spindle motor 20 at a predetermined rotational speed.

It should be noted that as shown in FIG. 2, although, for example, five magnetic disks 18 are accommodated in the housing 10 in this embodiment, the number of the magnetic disks 18 is not limited to this. Further, a single magnetic disk 18 may be accommodated in the housing 10.

In the housing 10, a plurality of magnetic heads 32 configured to carry out recording/reproduction of information on/from the magnetic disks 18, and a head stack assembly (actuator) 22 configured to support these magnetic heads 32 to freely move the magnetic heads 32 with respect to the magnetic disks 18 are provided. Further, in the housing 10, a voice coil motor (hereinafter referred to as a VCM) 24 configured to rotate and position the head stack assembly 22, ramp loading mechanism 25 configured to retain the magnetic head 32 at an unloading position separate from the magnetic disk 18 when the magnetic head 32 has moved to the outermost circumference of the magnetic disk 18, and board unit 21 on which electronic components such as a conversion connector (third connector) 52, and the like are mounted are provided. The board unit 21 is constituted of a flexible printed circuit (FPC), and this FPC is electrically connected to the magnetic heads 32 and the voice coil of the VCM 24 through a relay FPC on the head stack assembly 22.

The head stack assembly 22 includes a rotatable bearing unit 28, a plurality of arms 30 extending from the bearing unit 28, and suspensions 34 extending from the arms 30, and the magnetic head 32 is supported on a distal end part of each suspension 34.

A control circuit board 54 to be described later is screwed onto an outer surface of the bottom wall 12a of the base 12. The control circuit board 54 controls the operation of the spindle motor 20, and controls the operations of the VCM 24 and the magnetic heads 32 through the board unit 21.

Figure 3:
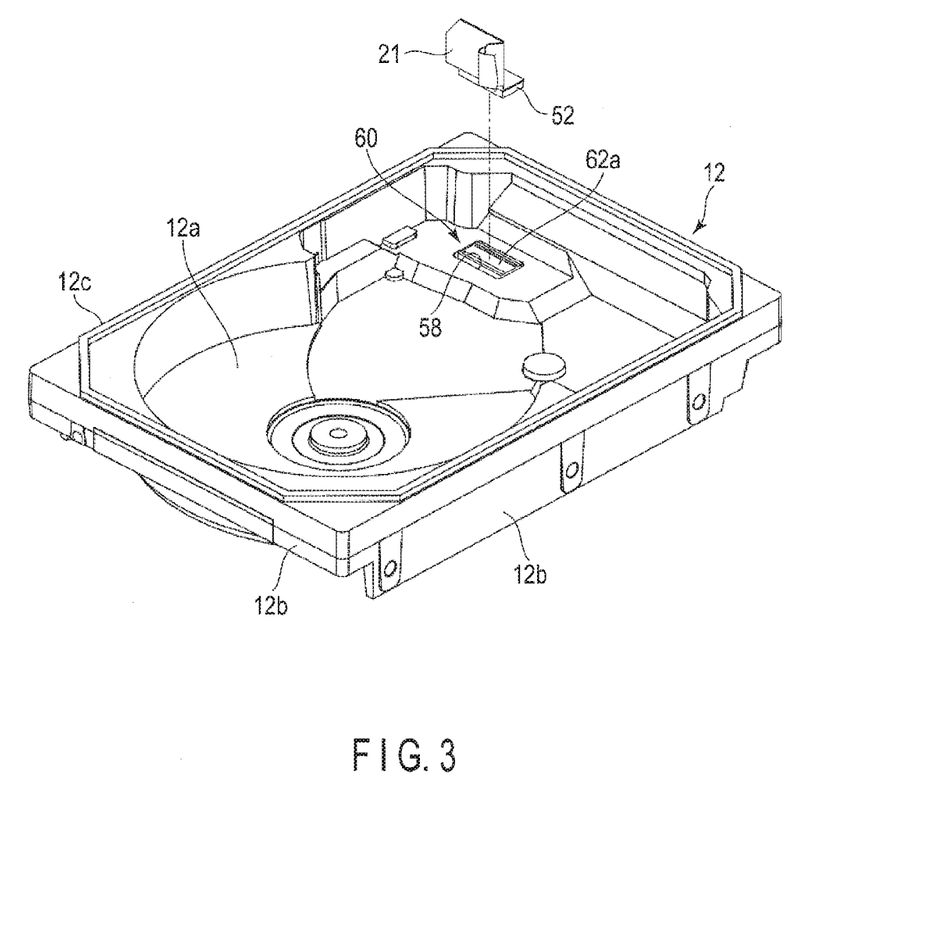
FIG. 3 is a perspective view showing a base of a housing of the HDD.
Figure 4:
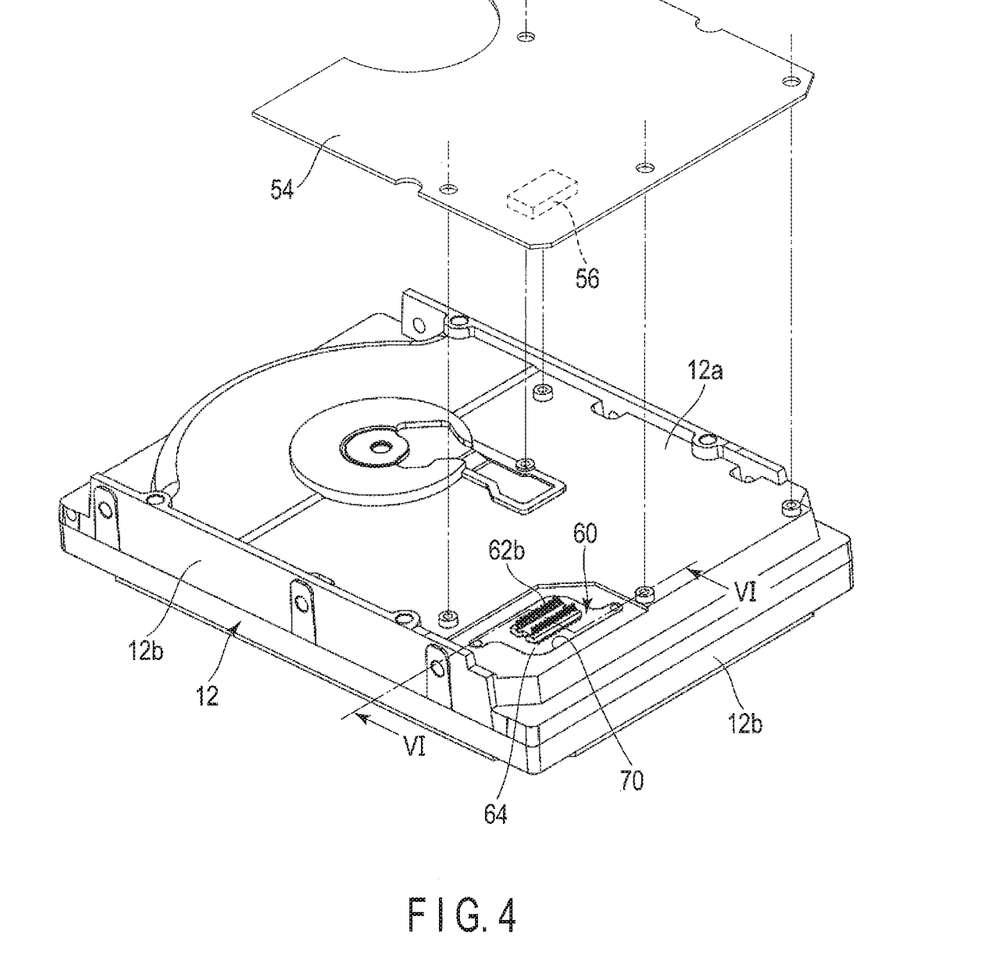
FIG. 4 is a perspective view showing the back surface side of the base.
Figure 5:
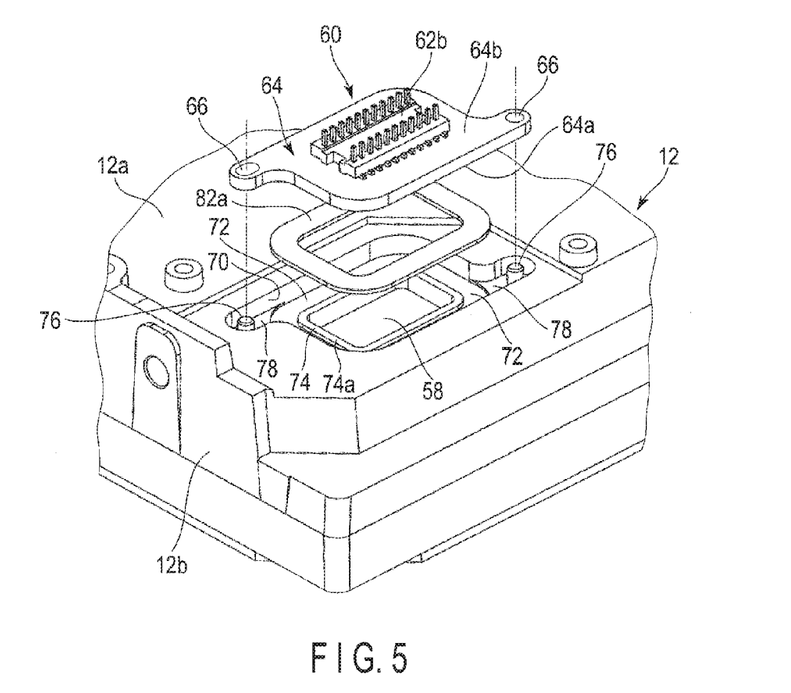
FIG. 5 is an exploded perspective view showing a connector installation part and a connector unit of the base.
Figure 6:
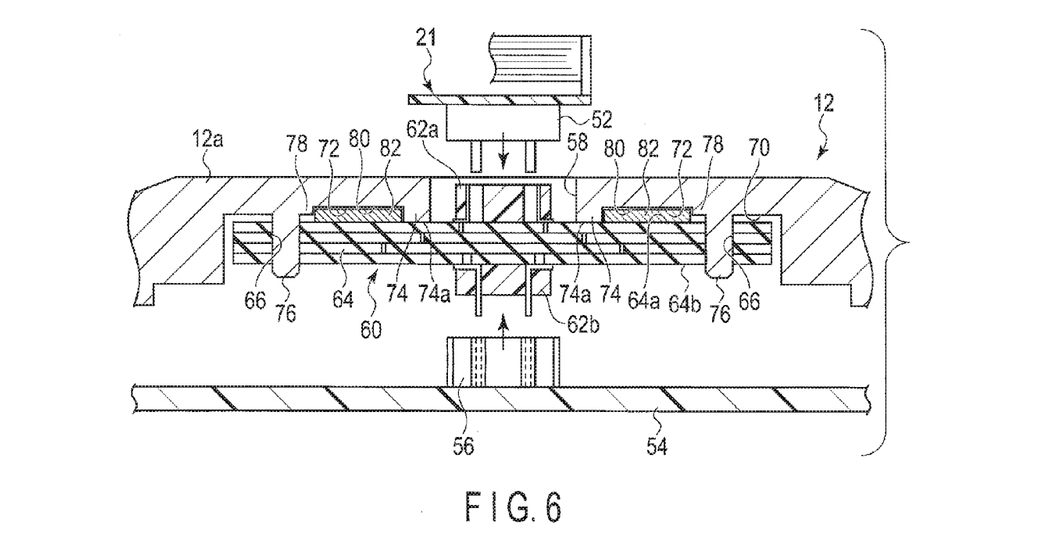
FIG. 6 is a cross-sectional view of the connector installation part and the connector unit taken along line VI-VI of FIG. 4.

FIG. 3 is a perspective view showing the base 12 of the housing 10, in a state where the constituent elements are removed therefrom, FIG. 4 is a perspective view showing the back surface side of the housing and the control circuit board, FIG. 5 is an exploded perspective view showing a connector installation part and a connector unit of the base, and FIG. 6 is a cross-sectional view of the connector installation part and the connector unit taken along line VI-VI of FIG. 4.

As shown in FIG. 3 and FIG. 4, in the bottom wall 12a of the base 12, for example, a rectangular through-hole (open hole) 58 is formed at an end part of the base 12 near one short side. The through-hole 58 is opened to the inner surface and the outer surface (rear surface) of the bottom wall 12a. Further, a first connector 62a of the connector unit 60 is attached to or inserted in the through-hole 58.

As shown in FIG. 5 and FIG. 6, in the rear surface (outer surface) of the bottom wall 12a, a substantially rectangular installation recess 70 is formed in the area including the through-hole 58. The bottom face of the recess 70 constitutes an installation surface 72 positioned around the through-hole 58. An annular, for example, a rectangular frame-shaped rib (projection) 74 surrounding the periphery of the through-hole 58 is provided on the installation surface 72 in a projecting manner. The inner circumferential surface of the rib 74 is flush with the inner circumferential surface of the through-hole 58. The rib 74 has a constant projection height (for example, 0.5 mm) and a constant width (for example, 1 mm) throughout the entire circumference thereof and, furthermore, the end face (contact surface) 74a of the rib 74 is formed flat.

A positioning pin 76 is provided at each of two corners opposed to each other in a diagonal direction of the installation surface 72 in a standing manner. The projection height of the positioning pin 76 is made substantially identical to the depth of the installation recess 70. It should be noted that the rib 74 and the two positioning pins 76 are formed integral with the bottom wall 12a of the base 12.

In this embodiment, a stepped portion 78 one step higher than the installation surface 72 is formed at each of the two corners opposed to each other in the diagonal direction of the installation surface 72, and the positioning pins 76 are provided at the stepped portions 78 in a standing manner. The height (step height) of the stepped portion 78 is made lower than the height of the rib 74. A plated layer, for example, a nickel-plated layer 80 is formed on the installation surface 72 except the end face 74a of the rib 74.

As shown in FIG. 5 and FIG. 6, the connector unit 60 includes a sealing board 64, and a first connector 62a and a second connector 62b mounted on this sealing board. The sealing board 64 is formed into a substantially rectangular shape corresponding to the installation recess 70 of the base 12, and is formed in a planar size slightly smaller than the installation recess 70. The sealing board 64 is constituted of, for example, a multi-layered circuit board formed by laminating a number of printed circuit boards. The sealing board 64 has a flat first principal surface 64a and a flat second principal surface 64b on the opposite side of the first principal surface 64a.

The first connector 62a is mounted on a substantially central part of the first principal surface 64a. The second connector 62b is mounted on a substantially central part of the second principal surface 64b, and is opposed to the first connector 62a. The first connector 62a and the second connector 62b are electrically connected to each other through conductive paths each of which is formed of a conductive layer or a through-hole formed in the sealing board 64.

A positioning hole 66 is formed at each of two corners opposed to each other in a diagonal direction of the sealing board 64. These positioning holes 66 are provided at positions corresponding to the positioning pins 76 of the base 12, and each of the positioning holes 66 is formed so that the positioning pin 76 can be inserted therein.

As shown in FIG. 4 through FIG. 6, the connector unit 60 is installed in the installation recess 70 formed in the bottom wall 12a of the base 12. That is, the sealing board 64 is installed in the installation recess 70 in a state where the first principal surface 64a and the first connector 62a are directed to the bottom wall 12a side. Each of the pair of positioning pins 76 is inserted in the corresponding positioning hole 66 of the sealing board 64. Thereby, the sealing board 64 is positioned in terms of the position in the plane direction with respect to the bottom wall 12a. The first principal surface 64a of the sealing board 64 is in contact with the end face 74a of the rib 74. Thereby, the sealing board 64 is positioned by the rib 74 in terms of the position in the thickness direction thereof. The first connector 62a is inserted in the through-hole 58 of the bottom wall 12a. The first connector 62a is exposed to the inside of the base 12 through the through-hole 58, and is accessible from the inside of the base 12.

At a part around the outside of the rib 74, a sealant (brazing material) 82 is provided between the installation surface 72 of the installation recess 70 and the first principal surface 64a of the sealing board 64. The sealing board 64 is fixed to the installation surface 72 by means of the sealant 82. In this embodiment, as the sealant 82, for example, solder is used. In the fixing and sealing process, as shown in FIG. 5, for example, a solder sheet 82a formed into an annular shape is arranged on the installation surface 72 around the outside of the rib 74. The sealing board 64 is implemented in the installation recess 70, the first principal surface 64a is made in contact with the end face 74a of the rib 74, and the first principal surface 64a is arranged on the solder sheet 82a. In this state, the solder sheet 82a is heated from the inner surface side or from the outer surface side of the base 12, thereby melting the solder sheet 82a. The molten solder wettedly spreads along the first principal surface 64a of the sealing board 64 and the installation surface 72 to thereby stick to the first principal surface 64a and the installation surface 72. At this time, the molten solder is prevented from flowing into the through-hole 58 by the rib 74. Furthermore, the nickel-plated layer 80 is formed on the installation surface 72 except the end face 74a of the rib 74, and hence the wettability of the molten solder on the installation surface 72 is improved. At the same time, the molten solder is prevented from flowing into the gap between the end face 74a of the rib 74 and the first principal surface 64a of the sealing board 64. Further, in this embodiment, the molten solder is restrained from excessively flowing to the outside by the stepped portion 78 provided on the proximal end side of each positioning pin 76. Thereby, most of the solder remains at the part between the rib 74 and the stepped portions 78, and sufficiently fills the space between the installation surface 72 and the first principal surface 64a therewith.

As shown in FIG. 6, the sealing board 64 is fixed to the installation surface 72 of the base 12 by the sealant 82, and covers the through-hole 58 of the base 12. At the same time, the space between the first principal surface 64a of the sealing board 64 and the installation surface 72 is hermetically sealed with the sealant 82. Thereby, the connector unit 60 hermetically seals the through-hole 58 on the rear surface side of the base 12. The first connector 62a of the connector unit 60 is inserted in the through-hole 58, and is exposed to the inside of the base 12 through the through-hole 58. That is, the first connector 62a is provided so that another connector can be connected to the first connector 62a from inside the base 12. A third connector 52 of the board unit 21 provided inside the base 12 is connected to the first connector 62a of the connector unit 60.

The second connector 62b of the connector unit 60 is exposed to the outer surface (rear surface) side of the base 12. As shown in FIG. 4 and FIG. 6, the control circuit board 54 is arranged to be opposed to the rear surface of the bottom wall 12a of the base 12, and is screwed onto the bottom wall 12a by means of a plurality of screws. The control circuit board 54 is provided to cover the connector unit 60. A fourth connector 56 is mounted on the control circuit board 54. This fourth connector 56 is connected to the second connector 62b of the connector unit 60. As described above, the magnetic heads 32 and the voice coil of the VCM provided inside the base 12 are electrically connected to the control circuit board 54 provided outside the base 12 through the relay FPC, board unit 21, third connector 52, connector unit 60, and fourth connector 56 in a state where the airtightness inside the housing 10 is maintained by the connector unit 60.

According to the HDD associated with the first embodiment configured as described above, in the fixation structure of the connector unit 60, the annular rib (projection) 74 is provided on the installation surface 72 around the through-hole 58, and the sealing board 64 is arranged in a state where the first principal surface 64a of the sealing board 64 is made in contact with the end face 74a of the rib 74, whereby it is possible to position the sealing board 64 in terms of the height position, i.e., the position in the thickness direction of the sealing board 64 with respect to the installation surface 72. Thereby, it is possible to maintain the gap between the first principal surface 64a of the sealing board 64 and the installation surface 72 constant, and manage the thickness of the sealant 82 to be filled into this gap constant. Further, it is possible by the rib 74 to prevent the sealant 82 from flowing into the through-hole 58, and retain the sealant 82 in the desired space. Furthermore, according to this embodiment, the stepped portions 78 are provided on the installation surface 72 on the outside of the rib 74. By virtue of these stepped portions 78, it is possible to suppress the flow of the sealant 82, and retain the sealant 82 in the desired space. Therefore, according to this embodiment, it becomes possible to reduce unnecessary spread and wetting of the sealant, and securely seal the desired space with a minimum amount of the sealant.

Further, according to this embodiment, by inserting the positioning pins provided on the installation surface 72 of the base 12 in a standing manner in the positioning holes 66 of the sealing board 64, the sealing board 64 is positioned in terms of the position in the plane direction with respect to the base 12. Accordingly, the in-plane positional accuracy of the first connector 62a and the second connector 62b is improved. Further, the influence of misalignment between the first connector 62a and the second connector 62b is made less significant irrespectively of the size of the first and second connectors 62a and 62b. Thereby, the third connector 52 inside the housing 10 and the fourth connector 56 outside the housing 10 can easily and stably be connected to the first connector 62a and the second connector 62b, respectively.

From the above description, according to the first embodiment, it is possible to obtain a disk device which is improved in the airtightness of the housing, and can easily be connected to the connector or the control circuit board outside the housing.

Next, an HDD according to another embodiment will be described. It should be noted that in another embodiment to be described in the following, parts identical to the aforementioned first embodiment are denoted by reference symbols identical to the first embodiment, their detailed descriptions are simplified or omitted, and parts different from the first embodiment are mainly described in detail.

Second Embodiment

Figure 7:
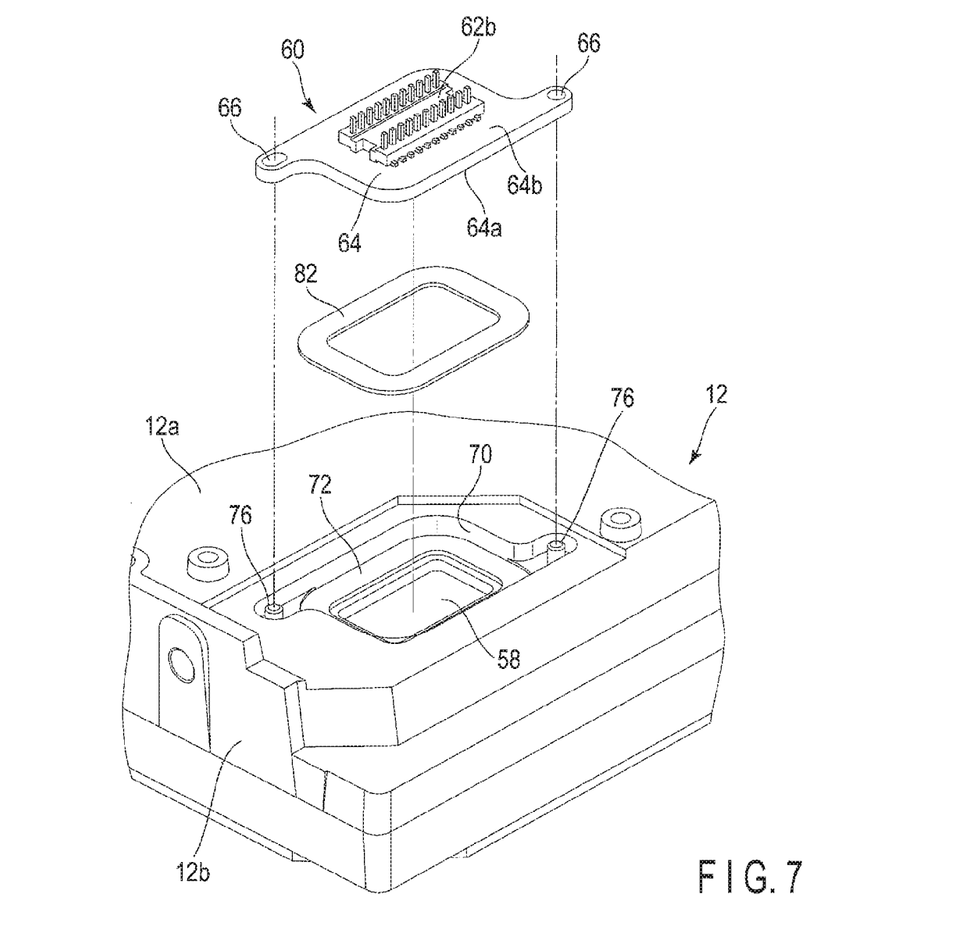
FIG. 7 is an exploded perspective view showing a connector installation part and a connector unit of a base of an HDD according to a second embodiment.
Figure 8:
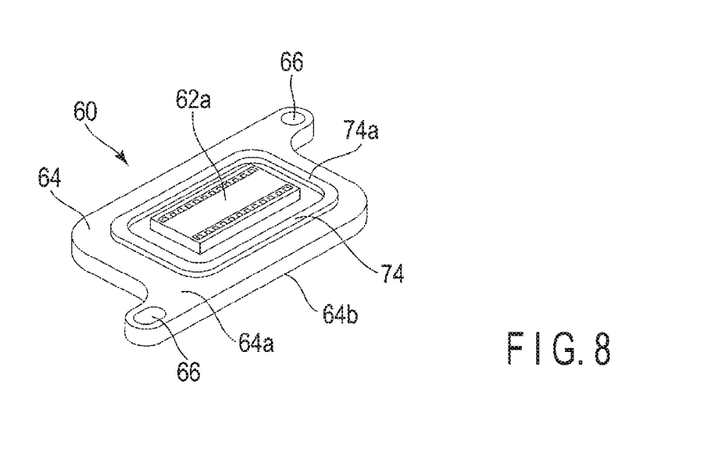
FIG. 8 is a perspective view showing the first principal surface side of a connector unit.
Figure 9:
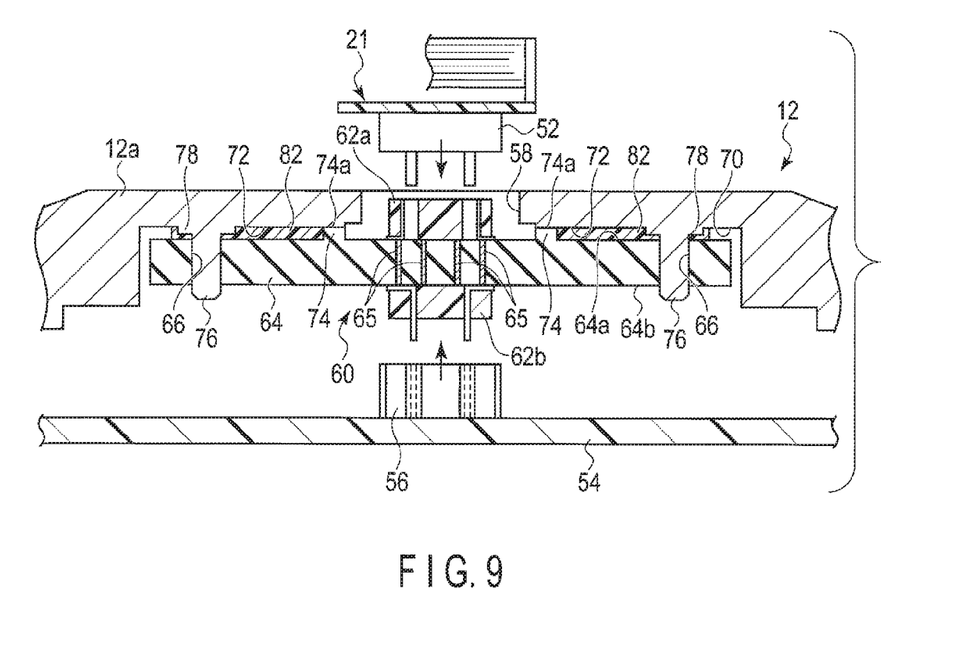
FIG. 9 is a cross-sectional view of the connector installation part and the connector unit of the base of the HDD according to the second embodiment.

FIG. 7 is an exploded perspective view showing a connector installation part and a connector unit of a base of an HDD according to a second embodiment. FIG. 8 is a perspective view showing the first principal surface side of a connector unit. FIG. 9 is a cross-sectional view of the connector installation part and the connector unit.

As shown in FIG. 7 and FIG. 8, according to the second embodiment, an installation surface 72 of an installation recess 70 is formed flat, and an annular rib 74 serving as a projection is provided on a first principal surface 64a of a sealing board 64. A positioning pin 76 is provided at each of two corners opposed to each other in a diagonal direction of the installation surface 72 in a standing manner. The projection height of the positioning pin 76 is made substantially identical to the depth of the installation recess 70. The two positioning pins 76 are formed integral with a bottom wall 12a of the base 12.

The connector unit 60 includes the sealing board 64, and a first connector 62a and second connector 62b mounted on this sealing board. The sealing board 64 is formed into a substantially rectangular shape corresponding to the installation recess 70 of the base 12, and is formed in a planar size slightly smaller than the installation recess 70. The sealing board 64 is formed of, for example, glass or ceramic. The sealing board 64 has a flat first principal surface 64a and a flat second principal surface 64b on the opposite side of the first principal surface 64a. The first connector 62a is mounted on a substantially central part of the first principal surface 64a. The second connector 62b is mounted on a substantially central part of the second principal surface 64b, and is opposed to the first connector 62a. The first connector 62a and the second connector 62b are electrically connected to each other through a plurality of conductive pins (conductive paths) 65 embedded in the sealing board 64.

An annular, for example, a rectangular frame-shaped rib (projection) 74 surrounding the periphery of the first connector 62a is provided on the first principal surface 64a of the sealing board 64 in a projecting manner. The rib 74 has a constant projection height (for example, 0.1 mm) and a constant width (for example, 0.5 mm) throughout the entire circumference thereof and, furthermore, the end face (contact surface) 74a of the rib 74 is formed flat. The rib 74 is formed of glass or ceramic and is formed integral with the sealing board 64. A positioning hole 66 is formed at each of two corners opposed to each other in a diagonal direction of the sealing board 64. These positioning holes 66 are provided at positions corresponding to the positioning pins 76 of the base 12, and each of the positioning holes 66 is formed so that the positioning pin 76 can be inserted therein.

As shown in FIG. 9, the connector unit 60 is implemented in the installation recess 70 formed in the bottom wall 12a of the base 12. The sealing board 64 is arranged in the installation recess 70 in a state where the first principal surface 64a and the first connector 62a are directed to the bottom wall 12a side. Each of the pair of positioning pins 76 is inserted in the corresponding positioning hole 66 of the sealing board 64. Thereby, the sealing board 64 is positioned in terms of the position in the plane direction with respect to the bottom wall 12a. Further, the sealing board 64 is installed in the installation recess 70 in a state where the end face 74a of the rib 74 is in contact with the installation surface 72 of the installation recess 70. Thereby, the sealing board 64 is positioned by the rib 74 in terms of the position in the thickness direction thereof, and the first principal surface 64a is opposed to the installation surface 72 with a gap corresponding to the height of the rib 74 held between them. The first connector 62a is inserted in the through-hole 58 of the bottom wall 12a. Thereby, the first connector 62 is exposed to the inside of the base 12, and is accessible from the inside of the base 12.

The space between the installation surface 72 of the installation recess 70 and the first principal surface 64a of the sealing board 64 is filled with a sealant 82 around the outside of the rib 74. According to this embodiment, as the sealant 82, a resin adhesive or gluing agent may be used. The sealant 82 is filled into the space between the first principal surface 64a of the sealing board 64 and the installation surface 72 in a state where the rib 74 of the sealing board 64 is pressed against the installation surface 72, i.e., in a state where the rib 74 of the sealing board 64 is made in contact with the installation surface 72. The sealing board 64 is fixed to the installation surface 72 by means of the sealant 82. At the same time, the space between the first principal surface 64a and the installation surface 72, and the part around the through-hole 58 are sealed with the sealant 82.

As described above, the sealing board 64 of the connector unit 60 is fixed to the installation surface 72 of the base 12 by means of the sealant 82, and covers the through-hole 58 of the base 12. At the same time, the space between the first principal surface 64a of the sealing board 64 and the installation surface 72 is hermetically sealed with the sealant 82. Thereby, the connector unit 60 hermetically seals the through-hole 58 on the back surface side of the base 12. The first connector 62a of the connector unit 60 is inserted in the through-hole 58, and is exposed to the inside of the base 12 through this through-hole 58. A third connector 52 of a board unit 21 provided inside the base 12 is connected to the first connector 62a of the connector unit 60. The second connector of the connector unit 60 is exposed to the outer surface (back surface) side of the base 12. A fourth connector 56 mounted on a control circuit board 54 is connected to the second connector 62b of the connector unit 60.

According to the HDD associated with the second embodiment configured as described above, in the fixation structure of the connector unit 60, the annular rib (projection) 74 is provided on the first principal surface 64a of the sealing board 64 around the first connector 62a, and the sealing board 64 is arranged in a state where the end face 74a of the rib 74 is made in contact with the installation surface 72 of the base 12, whereby it is possible to position the sealing board 64 in terms of the height position, i.e., the position in the thickness direction of the sealing board 64 with respect to the installation surface 72. Thereby, it is possible to maintain the gap between the first principal surface 64a of the sealing board 64 and the installation surface 72 constant, and manage the thickness of the sealant 82 to be filled into this gap constant. Further, it is possible by the rib 74 to prevent the sealant 82 from flowing into the inside of the through-hole 58, and retain the sealant 82 in the desired space. Furthermore, according to this embodiment, the stepped portions 78 are provided on the installation surface 72 on the outside of the rib 74. By virtue of these stepped portions 78, it is possible to suppress the flow of the sealant 82, and retain the sealant 82 in the desired space. Therefore, according to this embodiment, it becomes possible to reduce unnecessary spread and wetting of the sealant, and securely seal the desired space with a minimum amount of the sealant.

Further, according to this embodiment, by inserting the positioning pins provided on the installation surface 72 of the base 12 in a standing manner in the positioning holes 66 of the sealing board 64, the sealing board 64 is positioned in terms of the position in the plane direction with respect to the base 12. Accordingly, the in-plane positional accuracy of the first connector 62a and the second connector 62b is improved. Further, the influence of misalignment between the first connector 62a and the second connector 62b is made less significant irrespectively of the size of the first and second connectors 62a and 62b. Thereby, it becomes possible to easily and stably connect the third connector 52 inside the housing 10 and the fourth connector 56 outside the housing to the first connector 62a and the second connector 62b, respectively.

From the above description, according to the second embodiment too, it is possible to obtain a disk device which is improved in the airtightness of the housing, and can easily be connected to the connector or the control circuit board outside the housing.

It should be noted that in the second embodiment, the material of the sealing board 64 of the connector unit 60 is not limited to glass or ceramic, and a multi-layered circuit board similar to the first embodiment may be used. In this case, the rib (projection) 74 of the sealing board 64 can be formed of, for example, a resist layer formed on the surface of the circuit board. As the sealant 82, brazing material may be used.

Further, the configuration of the rib 74 of the sealing board 64 is not limited to the configuration in which the rib 74 is provided at a position in line with the inner circumferential surface of the through-hole 58 of the base 12, and the rib 74 may be provided at a position separate from the through-hole 58.

Figure 10:
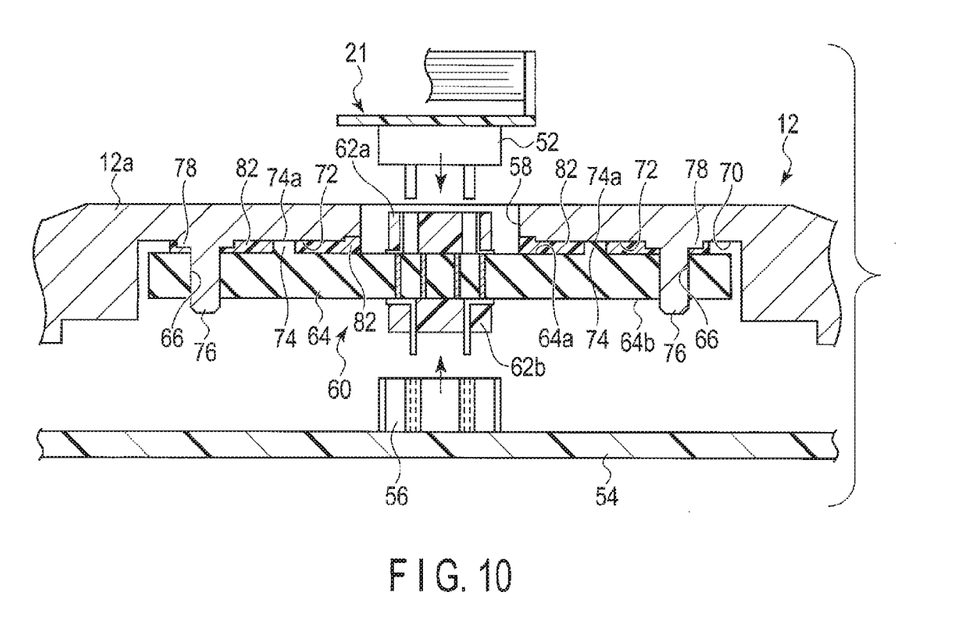
FIG. 10 is a cross-sectional view showing a connector installation part and a connector unit of an HDD according to a first modification example.

FIG. 10 is a cross-sectional view showing a connector installation part and a connector unit of an HDD according to a first modification example. As shown in this view, according to the first modification example, an annular rib 74 of a sealing board 64 is provided at a position outwardly separate from an inner circumferential surface of a through-hole 58 of a base 12. Outside and inside the rib 74, a sealant 82 is filled into the space between a first principal surface 64a of the sealing board 64 and an installation surface 72. When an adhesive or a gluing agent having no electrical conductivity is used as the sealant 82, even if the sealant flows into the through-hole 58 of the base, no problem of electrical continuity is caused. Accordingly, at the part between the rib 74 and the through-hole 58, the sealant 82 can be filled into the space between the first principal surface 64a of the sealing board 64 and the installation surface 72.

Third Embodiment

Figure 11:
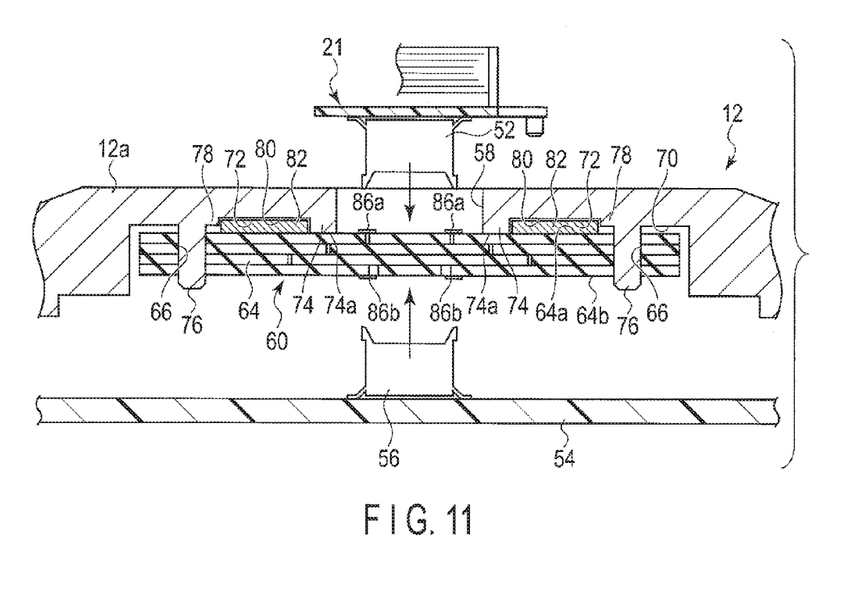
FIG. 11 is a cross-sectional view of a connector installation part and a connector unit of a base of an HDD according to a third embodiment.
Figure 12:
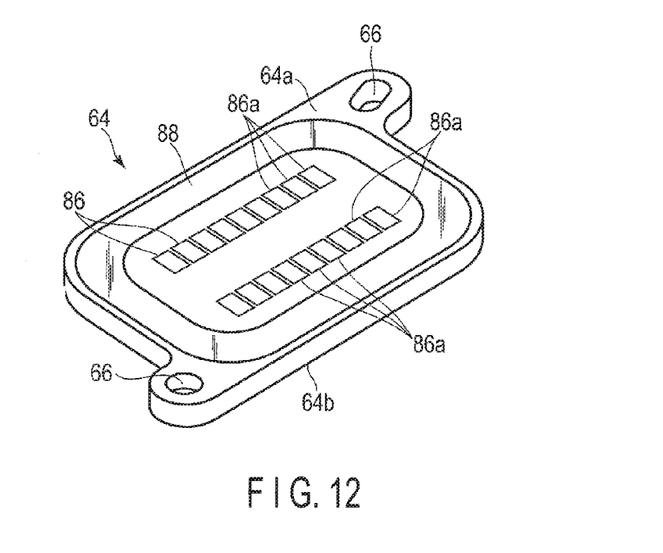
FIG. 12 is a perspective view showing a sealing board of the connector unit.

FIG. 11 is a cross-sectional view of a connector installation part and a connector unit of a base of an HDD according to a third embodiment, and FIG. 12 is a perspective view showing a sealing board of the connector unit.

As shown in FIG. 11 and FIG. 12, according to the third embodiment, the connector unit 60 includes only the sealing board 64, and first and second connectors are omitted. The sealing board 64 hermetically seals a through-hole 58 of the base 12, and functions also as a conductive member configured to electrically connect a conversion connector (third connector) 52 inside the base 12 and a fourth connector 56 on a printed circuit board 54 provided outside the housing to each other. Thereby, the so-called one piece connection structure configured to directly connect the conversion connector (third connector) 52 and the fourth connector 56 to each other can be obtained.

The structure of the instrumentation part in a bottom wall 12a of the base 12 is identical to the aforementioned first embodiment. That is, in the rear surface (outer surface) of the bottom wall 12a, a substantially rectangular installation recess 70 is formed in the area including a through-hole 58. The bottom face of the installation recess 70 constitutes an installation surface 72 positioned around the through-hole 58. An annular, for example, a rectangular frame-shaped rib (projection) 74 surrounding the periphery of the through-hole 58 is provided on the installation surface 72 in a projecting manner. The inner circumferential surface of the rib 74 is arranged flush with the inner circumferential surface of the through-hole 58. A positioning pin 76 is provided at each of two corners opposed to each other in a diagonal direction of the installation surface 72 in a standing manner. The projection height of the positioning pin 76 is made substantially identical to the depth of the installation recess 70. It should be noted that the rib 74 and the two positioning pins 76 are formed integral with the bottom wall 12a of the base 12. A plated layer, for example, a nickel-plated layer 80 is formed on the installation surface 72 except the end face 74a of the rib 74.

As shown in FIG. 11 and FIG. 12, the connector unit 60 includes a sealing board 64. The sealing board 64 is formed into a substantially rectangular shape corresponding to the installation recess 70 of the base 12, and is formed in a planar size slightly smaller than the installation recess 70. The sealing board 64 is constituted of, for example, a multi-layered circuit board formed by laminating a number of printed circuit boards. The sealing board 64 has a flat first principal surface 64a and a flat second principal surface 64b on the opposite side of the first principal surface 64a.

A plurality of conductive pads 86a are provided at a substantially central part of the first principal surface 64a. These conductive pads 86a are provided to be arranged in two rows along the longitudinal direction of the first principal surface 64a. On the first principal surface 64a, an annular or a track-shaped plated layer, for example, a gold-plated layer 88 is formed around the conductive pads 86a.

A plurality of conductive pads 86b are provided at a substantially central part of the second principal surface 64b of the sealing board 64. These conductive pads 86b are provided to be arranged in two rows along the longitudinal direction of the second principal surface 64b. Each of the conductive pads 86b and a corresponding conductive pad 86a on the first principal surface 64a side are electrically connected to each other through a conductive path constituted of a conductive layer, through-hole or the like formed in the sealing board 64.

A positioning hole 66 is formed at each of two corners opposed to each other in a diagonal direction of the sealing board 64. These positioning holes 66 are provided at positions corresponding to the positioning pins 76 of the base 12, and each of the positioning holes 66 is formed so that the positioning pin 76 can be inserted therein.

As shown in FIG. 11, the sealing board 64 is installed in the installation recess 70 formed in the bottom wall 12a of the base 12, and seals the through-hole 58. That is, the sealing board 64 is implemented in the installation recess 70 in a state where the first principal surface 64a is directed to the bottom wall 12a side. Each of the pair of positioning pins 76 is inserted in the corresponding positioning hole 66 of the sealing board 64. Thereby, the sealing board 64 is positioned in terms of the position in the plane direction with respect to the bottom wall 12a. Further, the first principal surface 64a of the sealing board 64 is in contact with the end face 74a of the rib 74. Thereby, the sealing board 64 is positioned by the rib 74 in terms of the position in the thickness direction thereof.

Around the outside of the rib 74, a sealant 82 is filled into the space between the installation surface 72 of the installation recess 70 and the first principal surface 64a of the sealing board 64. The sealing board 64 is fixed to the installation surface 72 by the sealant 82. In this embodiment, as the sealant 82, for example, solder is used. In the fixing and sealing process, for example, a solder sheet formed into an annular shape is arranged on the installation surface 72 around the outside of the rib 74. The sealing board 64 is arranged in the installation recess 70, the first principal surface 64a is made in contact with the end face 74a of the rib 74, and the first principal surface 64a is arranged on top of the solder sheet. In this state, the solder sheet is heated from the inner surface side or from the outer surface side of the base 12, thereby melting the solder sheet. The molten solder spreads along the first principal surface 64a of the sealing board 64 and the installation surface 72 in a wetting manner to thereby stick to the first principal surface 64a and the installation surface 72. At this time, the solder is prevented from flowing into the inside of the through-hole 58 by the rib 74. Moreover, the nickel-plated layer 80 is formed on the installation surface 72 except the end face 74a of the rib 74, furthermore, the gold-plated layer 88 is formed on the first principal surface 64a of the sealing board 64, and hence the wettability of the molten solder on the installation surface 72 and on the first principal surface 64a is improved. At the same time, the molten solder is prevented from flowing into the gap between the end face 74a of the rib 74 and the first principal surface 64a of the sealing board 64. Further, in this embodiment, the molten solder is restrained from excessively flowing to the outside by the stepped portion 78 provided on the proximal end side of each positioning pin 76. Thereby, most of the solder remains at the part between the rib 74 and the stepped portions 78, and sufficiently fills the space between the installation surface 72 and the first principal surface 64a therewith. The sealing board 64 is fixed to the installation surface 72 of the base 12 by the sealant 82, and covers the through-hole 58 of the base 12. At the same time, the space between the first principal surface 64a of the sealing board 64 and the installation surface 72 is hermetically sealed with the sealant 82. Thereby, the sealing board 64 of the connector unit 60 hermetically seals the through-hole 58 on the back surface side of the base 12. The conductive pads 86a of the sealing board 64 are exposed to the inside of the base 12 through the through-hole 58. The third connector 52 of a board unit 21 provided inside the base 12 is connected to the conductive pads 86a.

The conductive pads 86b on the second principal surface 64b side of the sealing board 64 are exposed to the outer surface (rear surface) side of the base 12.

The control circuit board 54 is arranged to be opposed to the back surface of the bottom wall 12a of the base 12. A fourth connector 56 is mounted on the control circuit board 54. This fourth connector 56 is connected to the conductive pads 86b of the sealing board 64. Thereby, the fourth connector 56 is electrically connected to the third connector inside the base 12 through the conductive pads 86a and 86b, and the conductive paths of the sealing board 64.

As described above, the magnetic heads and the voice coil of the VCM provided inside the base 12 are electrically connected to the control circuit board 54 provided on the outside of the base 12 through the relay FPC, board unit 21, third connector 52, sealing board 64, and fourth connector 56 in a state where the airtightness inside the housing 10 is maintained by the sealing board 64 of the connector unit 60.

According to the HDD associated with the third embodiment configured as described above, in the fixation structure of the sealing board 64, the annular rib (projection) 74 is provided on the installation surface 72 around the through-hole 58, and the sealing board 64 is arranged in a state where the first principal surface 64a of the sealing board 64 is made in contact with the end face 74a of the rib 74, whereby it is possible to position the sealing board 64 in terms of the height position, i.e., the position in the thickness direction of the sealing board 64 with respect to the installation surface 72. Thereby, it is possible to maintain the gap between the first principal surface 64a of the sealing board 64 and the installation surface 72 constant, and manage the thickness of the sealant 82 to be filled into this gap constant. Further, it is possible by the rib 74 to prevent the sealant 82 from flowing into the inside of the through-hole 58, and retain the sealant 82 in the desired space. Furthermore, according to this embodiment, the stepped portions 78 are provided on the installation surface 72 on the outside of the rib 74. By virtue of these stepped portions 78, it is possible to suppress the flow of the sealant 82, and retain the sealant 82 in the desired space. Therefore, according to this embodiment, it becomes possible to reduce unnecessary spread and wetting of the sealant, and securely seal the desired space with a minimum amount of the sealant. Further, according to this embodiment, by omitting the connectors provided on the sealing board 64, it becomes possible to reduce the number of components, and simplify the configuration.

From the above description, according to the third embodiment, it is possible to obtain a disk device which is improved in the airtightness of the housing, and can easily be connected to the connector or the control circuit board outside the housing.

Figure 13:
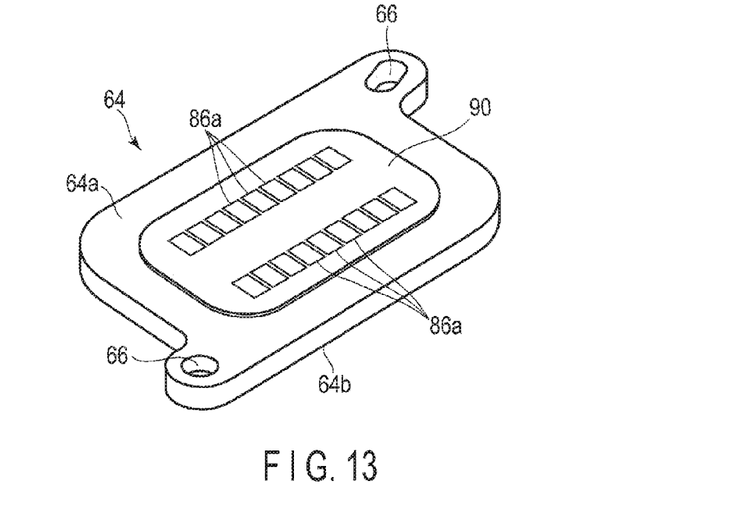
FIG. 13 is a perspective view showing a sealing board of an HDD according to a second modification example.

In the third embodiment described above, although the configuration is contrived in such a manner that the projection in the installation part is provided on the installation surface of the base 12, the configuration is not limited to this, and the projection may be provided on the sealing board 64 side. According to a second modification example shown in FIG. 13, a sealing board 64 includes a plurality of conductive pads 86a provided on a first principal surface 64a, and a substantially rectangular projection 90 provided around these conductive pads 86a. The projection 90 is formed of, for example, a resist layer provided on the first principal surface 64a. The projection 90 has a constant height (for example, 0.1 mm) over the entire top surface thereof and, furthermore, the top surface (contact surface) of the projection 90 is formed flat.

Further, the sealing board 64 is not limited to a multi-layered circuit board, and may be formed of other materials, for example, glass or ceramic. When glass or ceramic is used as the material, the conductive paths of the sealing board 64 may be constituted of a plurality of conductive pins embedded in the sealing board 64.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 14:
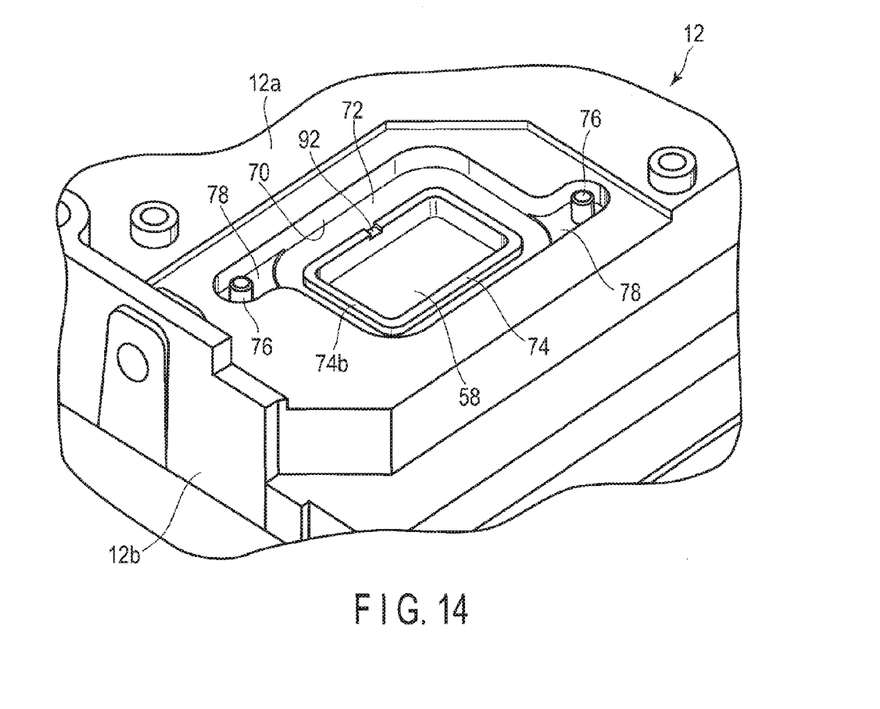
FIG. 14 is a perspective view showing a connector installation part of an HDD according to a third modification example.

For example, in the first, second, and third embodiments, the projection is not limited to a continuous annular rib, and projection divisions formed by dividing a projection into a plurality of divisions may be used. The shape of the projection is not limited to the rectangular shape, and is variously selectable. The shape of the sealing board of the connector unit, and the formation material for the sealing board are not limited to those in the aforementioned embodiments, and can be variously varied. The number of the positioning pins or the positioning holes is not limited to two, three or more positioning pins or positioning holes may be provided as the need arises. As in a third modification example shown in FIG. 14, a notch 92 may be provided in a part of the rib 74 serving as a projection. When a sealant, for example, solder is to be filled into the space between the installation surface 72 and the sealing board, by exhausting air from the inside of the rib 74 through the notch 92, it is possible to prevent air bubbles from occurring in the sealant.

Utilization of the connector unit 60 is not limited to the connection between the board unit inside the housing and the control circuit board outside the housing, and may be applied to a connection between other components. The materials, shapes, sizes, and the like of the elements constituting the disk drive may be changed as the need arises. In the disk drive, the number of magnetic disks, and the number of magnetic heads can be increased or decreased as the need arises, and the size of the magnetic disk is variously selectable.

What is claimed is:

1. A disk device comprising:
a rotatable disk recording medium;
a head which processes data on the recording medium;
a housing comprising a base accommodating the recording medium and the head and a cover joined to the base, the base comprising a through-hole and an installation surface formed around the through-hole; and
a sealing board fixed to the installation surface of the base to block the through-hole, the sealing board comprising a first principal surface, a second principal surface on an opposite side to the first principal surface, and a conduction path electrically connecting the first principal surface and the second principal surface to each other,
one of the first principal surface of the sealing board and the installation surface including a projection formed therein, and
the sealing board being fixed to the installation surface by an adhesive material including at least a brazing material, provided on an outer side of the projection, between the first principal surface and the installation surface, with the other of the first principal surface and the installation surface abutting against the projection,
wherein the base includes a stepped portion projecting from the installation surface and separating from the projection, and a height of the stepped portion is less than a height of the projection.

2. The disk device of claim 1, wherein
the projection is formed on the installation surface and includes a rib provided to surround the through-hole.

3. The disk device of claim 2, wherein
the rib includes an inner circumferential surface extending along an inner circumferential surface of the through-hole.

4. The disk device of claim 2, wherein
the adhesive material includes a solder.

5. The disk device of claim 4, wherein
the projection includes a contact surface in contact with the sealing board and the base comprises a plated layer formed on the installation surface except for the contact surface of the projection.

6. The disk device of claim 1, wherein
the projection includes a rib provided on the first principal surface of the sealing board.

7. The disk device of claim 6, wherein
the adhesive material includes an adhesive or a gluing agent.

8. The disk device of claim 1, wherein
the sealing board is formed of a resin and the projection is formed from a resist layer provided on the first principal surface.

9. The disk device of claim 1, wherein
the sealing board is formed of glass or ceramic.

10. The disk device of claim 1, wherein
the base includes a plurality of pins provided to stand on the installation surface, and
the sealing board includes a plurality of holes in which the plurality of pins are inserted, respectively.

11. The disk device of claim 10, wherein
the plurality of pins include two pins respectively provided to stand at diagonally opposite two corners of the installation surface.

12. The disk device of claim 1, wherein
the stepped portion is provided at each of diagonally opposite two corners of the installation surface.

13. The disk device of claim 12, wherein
the base includes two pins provided to stand on the stepped portions, and
the sealing board includes a plurality of holes in which the pins are inserted.

14. The disk device of claim 1, further comprising:
a first connector mounted on the first principal surface, and a second connector mounted on the second principal surface of the sealing board to oppose the first connector, and electrically connected to the first connector through the conduction path,
wherein
the first connector is exposed to an inside of the housing through the through-hole and the second connector is exposed to an external surface side of the housing.

15. The disk device of claim 1, wherein
the housing is enclosed with a gas of a density lower than that of air.

16. A disk device comprising:
a rotatable disk recording medium;
a head which processes data on the recording medium;
a housing comprising a base accommodating the recording medium and the head and a cover joined to the base, the base comprising a through-hole and an installation surface formed around the through-hole; and
a sealing board fixed to the installation surface of the base to block the through-hole, the sealing board comprising a first principal surface, a second principal surface on an opposite side to the first principal surface, and a conduction path electrically connecting the first principal surface and the second principal surface to each other, a projection formed on the installation surface and including a rib provided to surround the through-hole, and the sealing board being fixed to the installation surface by an adhesive material including a solder, provided on an outer side of the projection, between the first principal surface and the installation surface, with the other of the first principal surface and the installation surface abutting against the projection, the projection including a contact surface in contact with the sealing board and the base comprising a plated layer formed on the installation surface except for the contact surface of the projection.

17. The disk device of claim 16, wherein
the rib includes an inner circumferential surface extending along an inner circumferential surface of the through-hole.

18. The disk device of claim 16, wherein
the base includes a stepped portion projecting from the installation surface and separate from the projection, and a height of the stepped portion is less than a height of the projection.

19. The disk device of claim 16, wherein
the housing is enclosed with a gas of a density lower than that of air.

* * * * *